April 29, 1952 J. C. KOONZ 2,594,657
CONTROL SWITCH AND CIRCUIT FOR INDUCTION MOTORS
Filed June 4, 1947 2 SHEETS—SHEET 1
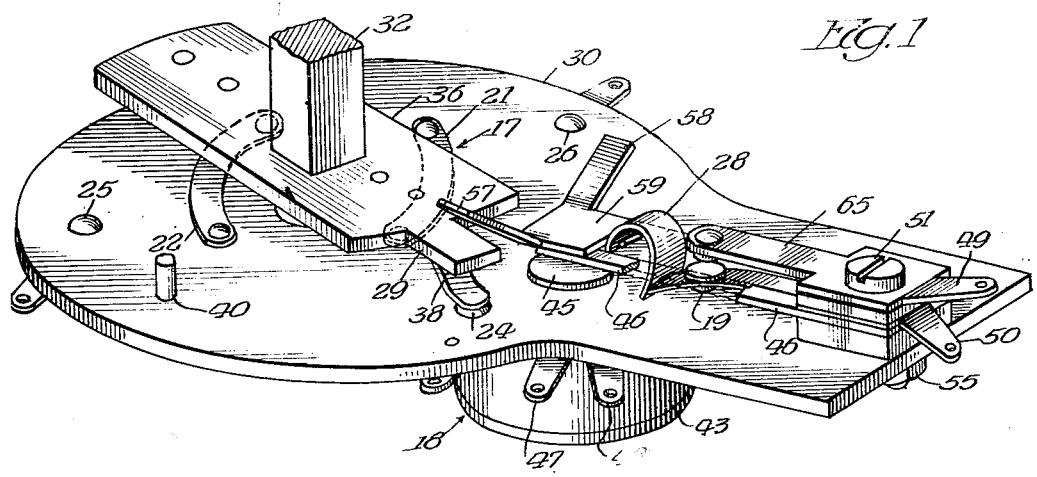
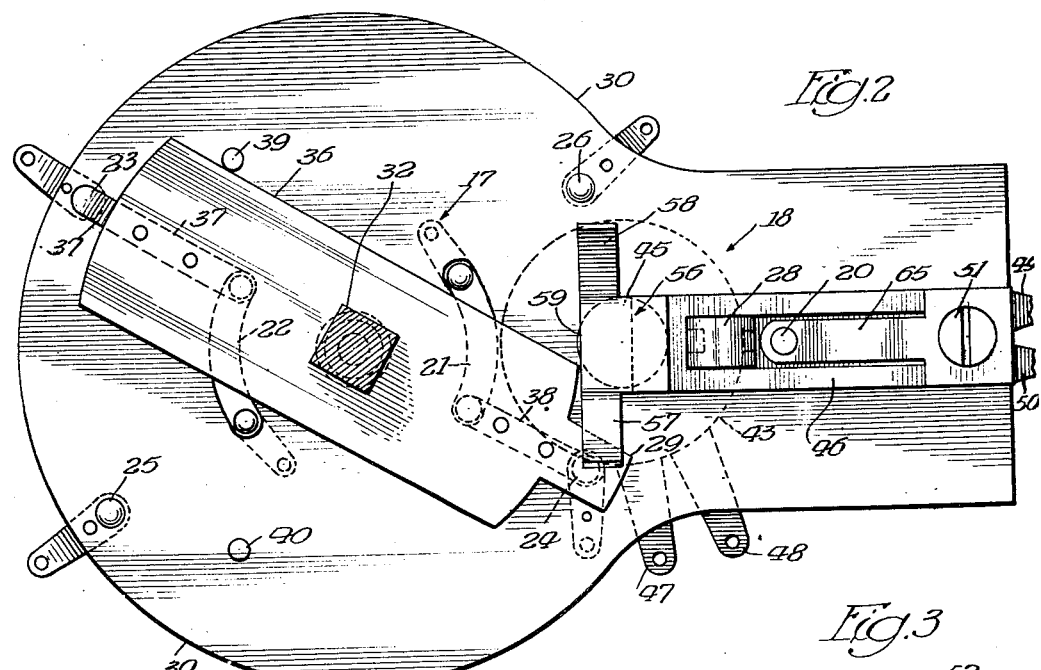
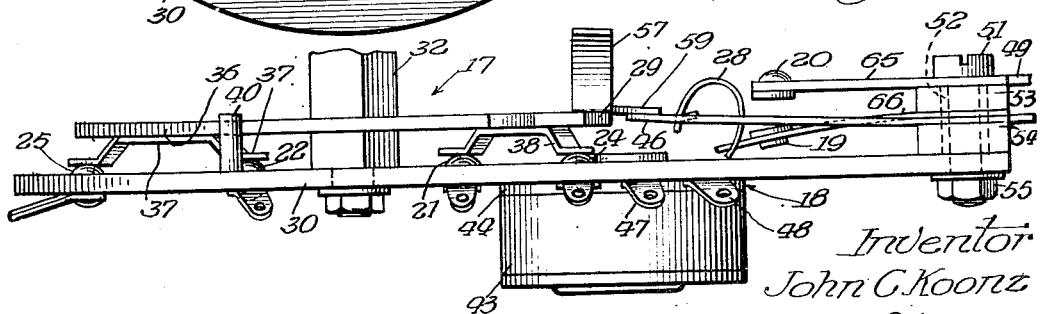
Inventor
John C. Koonz
By: Clarence J. Loftus
Atty.

April 29, 1952 J. C. KOONZ 2,594,657
CONTROL SWITCH AND CIRCUIT FOR INDUCTION MOTORS
Filed June 4, 1947 2 SHEETS—SHEET 2
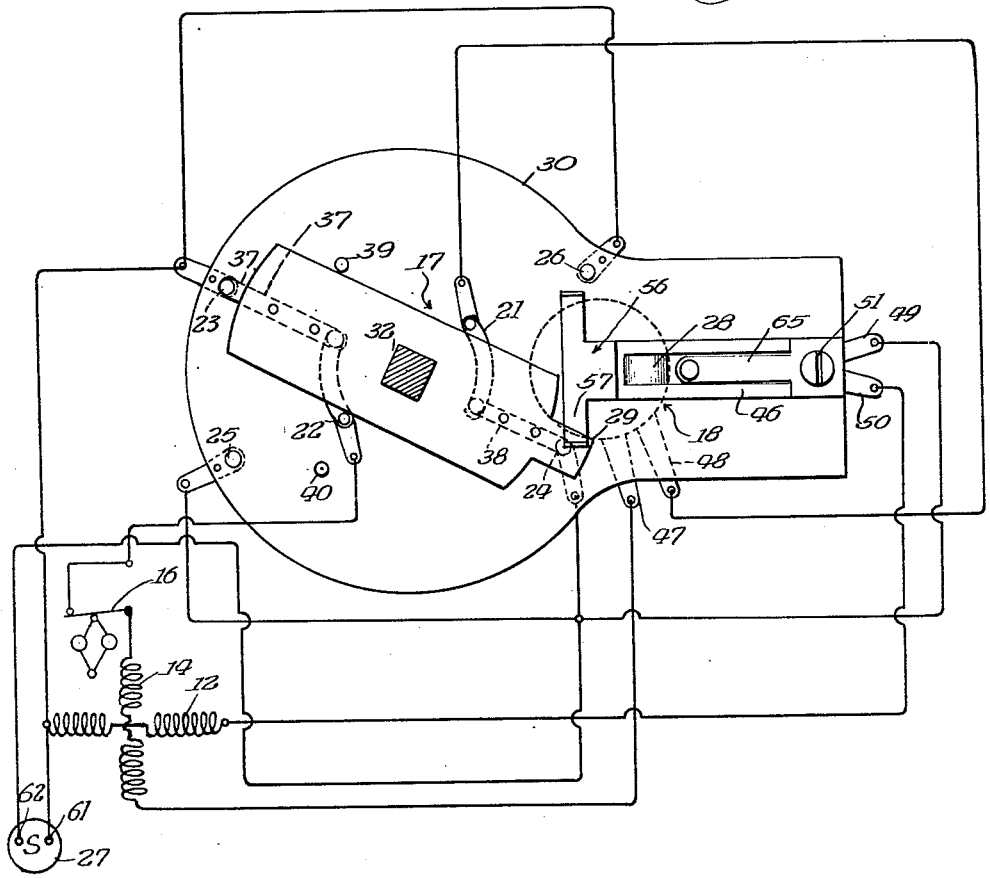
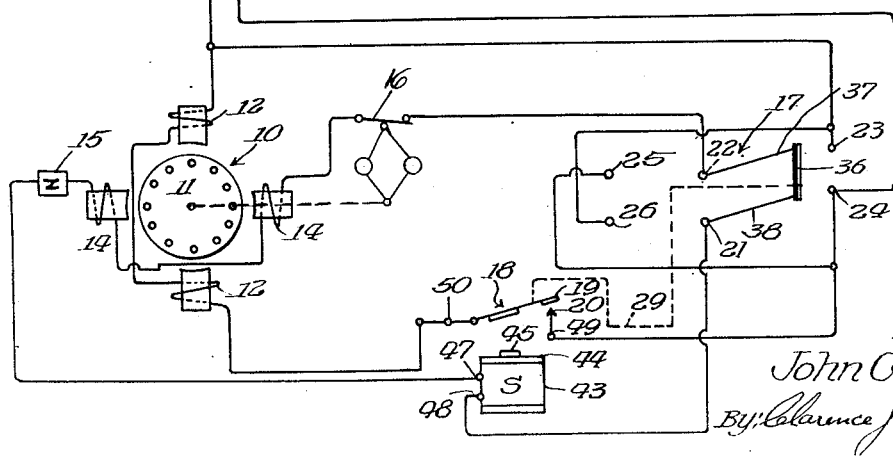
Inventor
John C. Koonz
By: Clarence J. Loftus
Atty Patented Apr. 29, 1952

2,594,657

UNITED STATES PATENT OFFICE 2,594,657

CONTROL SWITCH AND CIRCUIT FOR INDUCTION MOTORS

John C. Koonz, Fort Wayne, Ind., assignor to The Magnavox Company, Fort Wayne, Ind., a corporation of Delaware Application June 4, 1947, Serial No. 752,431

9 Claims. (Cl. 318—207)

1

The invention herein disclosed is a novel control switch and circuit for reversing a single-phase induction motor of the type having an auxiliary starting winding.

The problem solved by this invention may be brought into clear focus by tracing briefly the induction motor developments which gave rise to the problem. In the simple two-pole, single-phase, alternating current induction motor, for example, the stator and rotor windings cooperate to produce two alternating magnetic fields in space quadrature. The fields are also in time quadrature because they are produced by currents in time quadrature. Thus a revolving magnetic field is produced and the rotor "chases" that field.

However, there is no revolving magnetic field when the rotor is not running. The single-phase motor is therefore not self-starting. Therefore there is provided an auxiliary or starting winding located in space quadrature with respect to the main or running winding. The circuit constants of the two windings may be so proportioned that the currents therein are time-phase-displaced. In this manner a revolving magnetic field is produced and the induction motor develops sufficient torque to start.

The starting-winding and running-winding fields combine to form a resultant revolving field. Once the rotor is up to about 75% of synchronous speed, the starting winding becomes unnecessary and it is cut out by a centrifugal governor or switch. This winding is designed for intermittent duty and would burn out if used continuously.

The problem of readily and safely reversing such a self-starting single-phase motor by simple, reliable, efficient and economical means has for many years continued to try the ingenuity of research workers in this art. It has long been known that a commercially satisfactory split-phase motor of universal application could not be realized until this problem was solved.

The introduction of the centrifugal governor for cutting out the starting winding aggravated the problem because, if the starting winding leads are reversed while the motor is at operating speed, nothing will happen, the starting winding then being dead, having been cut off from the source by the centrifugal governor. The relative phases of the currents in starting and main windings determines the direction in which the motor starts. If no currents are flowing in the starting winding, nothing happens.

It is, accordingly, the principal object of the

2 invention to provide means, in or in conjunction with a single-phase motor, which means responds to one operation for reversing the motor.

The achievement of this object is for the benefit of unskilled workers, household consumers, housewives and children having no knowledge of electrical circuits, as well as for the benefit of persons familiar with electrical phenomena.

A further object is to provide a convenient, fast, safe and sure control-circuit, having such operation that a timer or other automatic mechanism or a person possessing no knowledge of the art can start, stop or reverse a split-phase motor.

Another object is to provide in a split-phase motor of the type including speed-responsive means for deenergizing the starting winding, a novel control circuit for reversing said motor and in one operation.

A further object is to provide, for reversing a split-phase motor, having a speed-responsively-controlled starting winding, a solenoid-actuated snap-action switch having contacts in such circuit relationship to the main winding that the main winding is energized only when they are closed, the winding of the solenoid being so arranged that it is energized to close said contacts when the starting winding is energized, whereby the motor runs in one direction, operative means for opening said contacts whereby the motor slows down, and means controlled by said operative means for reversing the polarity of one of the windings, whereby when the motor slows down—sufficiently to cause the speed responsive means to energize the starting winding—the solenoid winding is energized to close said contacts and energize the main winding, said motor thereupon running in the reverse direction.

Another object of the invention is to provide a novel control circuit having such operation that the initial energizing of the main winding of a split-phase motor is made contingent on prior energizing of the starting winding, which is in turn made contingent on the rotor not exceeding a predetermined speed, whereby the main winding is not normally energized unless the starting winding is first energized and the rotor speed zero or below said predetermined speed.

A further object of the invention is to provide, for use with a motor of the character described, the combination of an electromagnetic device in such circuit relationship with the starting winding that it is energized only when the starting winding is energized, and contacts controlled by said electromagnetic device and in such circuit relationship with the main winding that such contacts are closed when the electromagnetic device is energized, whereby the main winding is not normally energized until the starting winding is first energized.

It is also an object of the invention to provide, in or in conjunction with a split-phase motor, a novel switch comprising starting-winding-current polarity-reversing means, electromagnetic means for coupling the main winding to its energy source, and operative means having three positions: One, in which it causes currents of one polarity to flow in one of the windings and permits the electromagnetic means to couple the main winding to its energy source, whereby the motor runs in one direction; two, in which it uncouples the starting winding from its source and interacts with the electromagnetic means to uncouple the main winding from its energy source, whereby the motor is deenergized; and three, in which it causes currents of opposite polarity to flow in said one of the windings and permits the electromagnetic means to couple the main winding to its energy source, whereby the motor runs in the opposite direction.

Another object of the invention is to provide a combination reversing switch and relay having such operation that a split-phase motor controlled thereby starts, stops and reverses when the switch is actuated, as desired.

Other and further objects and capabilities of the invention will be apparent from the following description of the accompanying drawings, in which there is illustrated a preferred embodiment of switch and control circuit in accordance with the invention.

In the drawings:

Figs. 1, 2 and 3 are, respectively, perspective, top and end views of the novel control switch for readily and quickly starting, stopping or reversing a split-phase motor; the switch parts being shown in a position assumed when the motor is running in one direction.

Fig. 4 is a top plan view of my novel control switch and this figure includes a circuit schematic showing the relationships between the novel switch and novel control circuit; and Fig. 5 is a circuit diagram of the novel control circuit as used in conjunction with an induction motor.

Referring specifically to Fig. 5, there is symbolically illustrated a single-phase induction motor 10, having a rotor 11, a main running winding 12, and an auxiliary starting winding 14. It will be noted that windings 12, 14 are shown in space quadrature. The starting winding is shown in series with an impedance Z, numbered 15, intended to designate any arrangement whereby a time-phase-displacement between the currents flowing in windings 12, 14 is obtained. Z may consist of a resistance in series with the starting winding (in a resistance-start motor) or a capacitor in series with the starting winding (in a capacitor-start motor). Other expedients for obtaining the required time-phase-displacement may be used, such as employing high resistance or small gauge wire for the auxiliary winding or inserting a reactance in series with the main winding (in the case of a reactance-start motor). The components 11, 12, 14, and 15 are intended to designate any conventional split-phase induction motor. Such motors are per se well known to the art.

The starting winding is in series with the circuit making-and-breaking contacts of a speed-responsive device or centrifugal governor 16. Such governors are also well known to the art. They operate in conjunction with the rotor to cut out the starting winding (i. e., to uncouple it from its energy source) when the rotor attains a predetermined speed, say 75% to 80%, of operating speed. When the rotor falls below that speed the starting winding is again cut in and energized. It will be seen that, when the motor is running at operating speed, a mere reversal of the starting-winding leads of a prior-art motor circuit accomplishes nothing, that winding being dead both before and after reversal of the leads. Further, the main winding would still be energized and the motor would continue to run in the same direction. Also, if the polarity of the main winding is reversed, without waiting for the starting switch in series with the auxiliary winding to close, the motor would still run in the same direction.

In accordance with the invention there is provided a novel combination of a polarity-reversing switch 17 and other features required for obtaining the desired motor control: i. e., ready reversing starting and stopping. Specifically, the starting winding 14 is electrically arranged in series with contacts 21 and 22 of a switch 17, effectively a double-throw, double-pole switch. An alternating current supply source 27 is electrically coupled to contacts 23 and 24 of this switch. Switch 17 has two other contacts 25 and 26 electrically connected, respectively, to contacts 24 and 23. It will be seen that when the switch blades of unit 17 are in one extreme position, contacts 22 and 23 are electrically closed, contacts 21 and 24 are electrically closed, and currents of a certain phase with respect to the running winding 12 flow in starting winding 14. When the switch blades are in a central position, contacts 21 and 22 are unconnected or "cold" and the starting winding 14 is deenergized. When the switch blades are in the other extreme position, contacts 21 and 26 are closed, contacts 22 and 25 are closed, and currents of the opposite phase flow in starting winding 14. This switch 17 constitutes phase-reversing or polarity-means for the starting winding. Many proper substitutes for this particular switch 17—herein shown, together with other features, in explaining the best mode in which the principles of the invention are applied—could be made by those skilled in the art, many double-throw, double-pole switches being per se old and well-known devices. In order fairly to protect the invention, this element is referred to as "polarity-reversing means" or "phase-reversing" means in certain of the appended combination and subcombination claims.

In accordance with the features of the invention the main winding 12 is so controlled with respect to the energy source 27 that the main winding is always energized subsequent to the energization of the starting winding 14. This is accomplished by a solenoid-actuated relay 18. The solenoid-actuated relay 18 so controls the main winding relationship to its energy source that the main winding 12 is energized only when the starting winding 14 is first energized.

The exciting winding of this relay is included in series with the starting winding 14, so that the relay is always energized when the starting winding is energized. This relay, when energized, closes its contacts 19, 20, which contacts are included in circuit between the main winding 12 and source 27.

It will be noted that switch 16 cuts out the starting winding 14 as the motor approaches operating speed, deenergizing the exciting winding of relay 18. To keep contacts 19, 20 closed and the main winding energized until reversal or stopping is desired, these contacts are provided with a toggle or stabilizing means 28 (Fig. 1) to urge them closed—once they have been closed by relay 18.

The dashed line 29 indicates means, presently to be described, whereby the contacts 19, 20 are to be mechanically opened whenever the phase of the currents flowing in the starting winding is to be reversed or whenever the motor is stopped, by operation of switch 17. The contacts 19, 20 and the stabilizing means 28 have such action that the contacts are then urged apart, but they are closed, of course, when relay 18 is energized.

The operation of this novel control circuit is now described. When motor operation in one direction is to be obtained, switch 17 is thrown from its central position to, let us say, the right-hand position (Fig. 5), electrically closing contacts 22 on 23 and 21 on 24. The contacts of switch 16 have already been closed because the rotor is at rest. The starting winding 14 and relay 18 are energized. Contacts 19, 20 are closed. The main winding 12 is energized and the motor starts. As it approaches operating speed, switch 16 opens, deenergizing the starting winding 14 and relay 18. Contacts 19, 20 remain closed, by reason of the action of toggle 28. The motor continues to run. This is accomplished by one operation.

If the motor is to be stopped, switch 17 is opened, whereby means 29, presently to be described, opens contacts 19, 20. Both main and starting windings are deenergized and the motor stops. If the motor is to be reversed, switch 17 is thrown to the opposite position (left-hand, Fig. 5). No matter how rapidly or slowly this operation is performed, the desired ready reversal is obtained. While the switch is being thrown, means 29 opens contacts 19, 20, deenergizing the main winding 12. Spring means 28 keeps contacts 19, 20 open and the motor slows down until centrifugal governor 16 closes its own contacts. As the switch 17 reaches its extreme position contact 22 closes on contact 25 and contact 21 closes on contact 26, reversing the polarity of the starting winding 14. When the motor slows down to the speed at which governor 16 closes its own contacts, the starting winding 14 and relay 18 are energized. Contacts 19, 20 then close and the main winding is also energized. Since the phase of the currents in starting winding 14 has been reversed, the motor starts and runs in the opposite direction. If the motor is then to be stopped, switch 17 is opened, whereby means 29 opens contacts 19, 20. If the motor is again to be reversed, the switch is thrown to the right-hand position (Fig. 5). It will be seen that this simple circuit solves the problem and satisfies the long-existing demand for a device whereby, in one operation, a split-phase motor can be started, stopped or reversed.

Generic aspects of this invention, based on its directive concepts, embrace equivalents whereby the energizing of the main winding is made contingent on prior closure of the centrifugal switch and energization of the starting winding. Such generic aspects also embrace equivalents whereby electro-magnetic or electrical means energized in conjunction or at the same time with the starting winding determine whether or not the main winding will be coupled to its source. Such generic aspects further embrace equivalents whereby the main winding is opened during or following reversal of the polarity of the starting winding, and/or equivalents whereby the main winding is not coupled to its source again until the starting winding is energized by the action of the centrifugal switch.

The invention also provides a novel control switch for use in the above-described control circuit or the like. Those elements of the Fig. 1–4 switch corresponding to the elements symbolically represented in Fig. 5 have the same reference numerals, so that the functions of those elements, so shown in Figs. 1–4, will be understood.

The switch 17 and the relay 18 are mounted on a fan-shaped insulating base 30. Switch 17 includes a shaft 32, mounted for rotation on base 30.

It will be understood that shaft 32 may be manually controlled or that it may be rotated by a timer or other suitable mechanism.

Securely mounted on the main body portion of shaft 32 is an arm 36 of insulating material. Shaft 32 and arm 36 are the operative means or member adapted to be operated or shifted between two phase-determining positions. Between the two extreme phase-determining positions is an intermediate "off" position, at which point the main winding is always deenergized. However, instead, a continuously rotatable switch could be utilized, such as would be used with a timer or automatic machines where motor reversal is desired. Rigidly secured to this rotary arm 36 are longitudinally extending conductive metallic wipers 37 and 38. Stops 39 and 40, secured to base 30, limit the angular movement of arm 36. Rigidly secured to the base 30 are arcuate flat metallic contacts 21 and 22, disposed with their concave edges facing each other. The radially inner end of wiper 37 is always in contact or frictional sliding engagement with contact 22. The other or radially outer end of wiper 37 is in contact with contact 23 when arm 36 is in one extreme position, in contact with contact 25 when arm 36 is in the other extreme position and in contact with neither when arm 36 is in a central position.

Similarly, one end of wiper 38 is always in contact with contact 21 and the other end of wiper 38 is in contact with contact 24 when arm 36 is in one extreme position, in contact with contact 26 when arm 36 is in the other extreme position and in contact with neither when arm 36 is in a central position. The symbolic representation in Fig. 5 graphically shows the operation of the rotary switch shown in Figs. 1–4.

Contacts 25 and 26 are positioned in diametrical opposition on base 30. Contacts 23, 24 are similarly positioned. These contacts may be provided with integral conductive terminal tabs and are secured to the upper face of the base 30 in any suitable manner, as by riveting. Contacts 21 and 22 are also preferably provided with such tabs and secured to the upper face of the base as by riveting. Wipers 37 and 38 are similarly secured to the lower face of the arm 36 and have such shapes and spring action as always to remain in electrical conductive relation and contact with contacts 22, 21, respectively.

The exciting winding 43 of relay 18 is preferably mounted on a bobbin 44, rigidly secured to base 30 by bonding to the underside of base 30. The magnetized core 45 of the relay extends through an aperture in the base with its face in proximity to an armature 46, made of resilient magnetic material. The winding leads are brought out to terminals 47, 48, riveted to the base 30. Armature 46 is shown in Fig. 1, with its central portion broken away, for purposes of clarity.

Switch contact 20 is rigidly mounted on a relatively thick rigid metallic blade 65 having an integral terminal tab 49. Contact 19 is mounted on a metallic spring blade 66 having an integral terminal tab 50. A threaded screw 51 and insulating sleeve 52 project through apertures in the fixed ends of these blades and armature 46, and through insulating washers 53 and 54, whereby the blades are secured in spaced relation to base 30, as by a lock nut 55.

Armature 46 is mounted as a cantilever between the fixed end of blade 66 and washer 54 (Fig. 3). The armature is formed with a longitudinal slot through which the free portion of blade 66 may pass when that blade flexes. Secured to the top of the free end of the armature is a T-shaped lifter head 56. This lifter head could, if desired, be made integral with armature 46. An arcuate toggle spring 28 is mounted with its ends slotted and fitting over integral lugs extending from armature 46 and blade 66, respectively.

The operation of the relay-controlled switch contacts just described is such that when relay 18 is energized, core 45 attracts the armature 46, toggle spring 28 then causing contact 19 to snap upwardly into contact with contact 20. On the other hand, when lifter head 56 is elevated, contact 19 makes a quick break with respect to contact 20. Contacts 19 and 20 stay open or closed, as the case may be, until armature 46 is depressed by relay 18 or until lifter head 56 is elevated. Switch elements 46, 28, 19, 20, 65, 66, 51, 52, 53, 54 and 55 function as a snap-action switch for controlling the opening and closing of the main winding circuit. Elements 32, 36, 37, 38, 21, 22, 23, 24, 25 and 26 function as a polarity-reversing switch for coupling the starting winding 14 and relay 18 to source 27 with either polarity desired (when the arm 36 is in one of its extreme positions) or for uncoupling the starting winding from the source (when the arm 36 is in a central angular position).

The means for uncoupling the main winding 12 from its source by breaking contacts 19, 20 during the polarity-reversing operation comprises an integral projection or cam 29 on arm 36. Lifter head 56 is formed with upwardly and laterally extending wings 57 and 58 and a central flat portion 59. When projection 29 passes under portion 59, as the arm 36 approaches its central position, head 56 and armature 46 are lifted, breaking contacts 19, 20.

Let it be assumed that shaft 32 and arm 36 are turned to their clockwise limit. Then the following events occur:

(1) The starting winding 14 and relay 18 are energized through the circuit 61, 23, 37, 22, 16, 14, 47, relay winding, 48, 21, 38, 24, 62;

(2) Contacts 19, 20 close, and are mechanically latched in that position by 28;

(3) The main winding 12 is energized through the circuit 61, 12, 50, 66, 19, 20, 65, 49, 62;

(4) The motor runs in one direction;

(5) Switch 16 opens and the motor continues to run.

When the shaft 32 and arm 36 are turned to their central position, these events occur:

(1) Wiper 37 leaves contact 23 and wiper 38 leaves contact 24;

(2) Projection 29 causes contacts 19, 20 to be broken;

(3) The main winding 12 and the starting winding 14 being deenergized, the motor slows down;

(4) Switch 16 recloses;

(5) The motor stops.

When the shaft 32 and arm 36 are turned to their extreme counterclockwise position, these events occur:

(1) The starting winding 14 and relay 18 are energized through the circuit 61, 26, 38, 21, 48, relay winding, 47, 14, 16, 22, 37, 25, 62. Note that the polarity of currents through this circuit has been reversed;

(2) Contacts 19, 20 close, and are mechanically latched in that position by spring 28;

(3) The main winding 12 is energized through the circuit 61, 12, 50, 66, 19, 20, 65, 49, 62.

(4) The motor runs in the opposite direction.

(5) Switch 16 opens and the motor continues to run.

The direction of rotation of the motor may be controlled by the simple expedient of turning shaft 32. Similarly, the motor may be started and stopped. This is accomplished by a very simple and inexpensive unitary device comprising a solenoid, a snap-action switch controlled in part thereby, a rotary polarity-reversing switch and an arrangement whereby the rotary switch adjustment and another part of the snap-action switch control are simultaneously effected. This device can be operated by timers or other mechanisms or by members of the public having no technical knowledge of electrical devices.

The above-described device may be made separately and attached to or used in conjunction with the motor or it may originally be built into the motor.

It will be noted that the preferred embodiment has such operation that contacts 19—20 are mechanically opened when the main winding 12 is uncoupled from its source. It is within the true scope of the invention to provide means for performing this function electrically. While there has been shown and described what is at present regarded as the preferred embodiment of the present invention, it will be obvious to those skilled in the art that various modifications and substitutions of equivalents—such as those suggested herein—may be made without departing from the true scope of the invention in certain generic aspects. For example, the relative phases of the currents in the starting and running windings determine the direction in which the motor runs. In accordance with the best mode, the phase of the currents in one of the windings is reversed. The starting winding was chosen for purposes of illustration but not of limitation. The running winding 12, after disconnection from its source 27, could be reversed instead of the starting winding, and not reenergized until contacts 19, 20 again close. Further, a switch arm 36 having an oscillating or "to and fro" movement is herein shown for purposes of illustration. In the claims appended hereto, equivalents such as continuously rotatable switches are covered. Many of such equivalents will now be obvious to those skilled in the art who have this disclosure before them. In the claims appended hereto, the true scope of the invention is believed fairly and accurately to be defined. It is, accordingly, intended in the appended claims to cover all such modifications and changes as fall within the true scope of the invention.

Having thus described my invention, I claim:

1. A control device for starting, stopping and readily reversing a single-phase induction motor of the type having a main running winding and an auxiliary starting winding and a speed-responsive device for disconnecting the auxiliary winding from its source, comprising a phase-reversing switch electrically in circuit between the auxiliary winding and its energy source, said switch including an arm mounted for rotation between two extreme phase-determining positions and intermediate open-circuit positions, a pair of contacts electrically in circuit between the main winding and its source, stabilizing means for urging the contacts in closed relationship when they are closed or in open relationship when they are opened, a relay adapted to be energized only when the auxiliary winding is energized for closing the contacts, said relay including an armature carrying one of said contacts, said arm having a cam so arranged as to lift the armature and to open the contacts on initial rotation away from either phase-determining position but to free them on continued rotation of the arm toward the other reverse-phase position, whereupon in one operation the main winding is deenergized to permit the motor to slow down until the speed-responsive means connects the starting winding to its source for energization, when the relay is energized to close the contacts and to energize the main winding, thereby to reverse the motor.

2. A control device for starting, stopping and reversing a single-phase induction motor of the type having a main running winding and an auxiliary starting winding and a speed-responsive device for disconnecting the auxiliary winding from its source comprising, in combination, a polarity-reversing switch for controlling the phase of the current flowing in said auxiliary winding, a relay in circuit with the starting winding for coupling said running winding to its source of energy, said relay including a pair of electrical contacts in circuit with the running winding, one of said contacts being mounted on the relay armature, and a cam on the polarity-reversing switch for engaging the armature and opening the contacts during a polarity-reversing operation of the switch.

3. A control device for reversing a single-phase induction motor of the type having a main running winding and an auxiliary starting winding and a speed-responsive device for disconnecting the auxiliary winding from its source comprising, in combination, a base member, a polarity-reversing switch consisting of a member rotatably mounted on said base member and a plurality of conductive wipers rigidly secured to the arm and conductive contacts rigidly secured to the base, said contacts and wipers and associated connections being so arranged that the rotary switch has three positions, a first position in which it causes currents of one polarity to flow in the starting winding, a second in which it uncouples the starting winding from its source, and a third in which it causes currents of opposite polarity to flow in the starting winding, a snap-action switch mounted on the base and having contacts electrically in series circuit between the main winding and its source, a solenoid mounted on the base and having an exciting winding in series relationship to the auxiliary winding whereby the solenoid is energized to close said contacts thereby to energize the running winding when the auxiliary winding is energized, and means operable in synchronism with said rotatably-mounted member for opening the contacts of said snap-action switch, whereby when said arm is rotated between its first and third positions said main winding is deenergized to permit said motor to slow down to such a degree that the speed-responsive means connects the starting winding to its source.

4. A control device for starting, stopping and readily reversing a single-phase induction motor of the type having a main running winding and an auxiliary starting winding and a speed-responsive device for disconnecting the auxiliary winding from its source, comprising a phase-reversing switch electrically in circuit between one of said windings and its energy source, said switch including an arm mounted for rotation between two extreme phase-determining positions and intermediate open-circuit positions, a pair of contacts electrically in circuit between the main winding and its source, stabilizing means for urging the contacts in closed relationship when they are closed or in open relationship when they are opened, a relay adapted to be energized only when the auxiliary winding is energized for closing the contacts, said relay including an armature carrying one of said contacts, said arm having a cam so arranged as to lift the armature and to open the contacts on initial rotation away from either phase-determining position but to free them on continued rotation of the arm toward the other reverse-phase position, whereupon in one operation the main winding is deenergized to permit the motor to slow down until the speed-responsive means connects the starting winding to its source for energization, when the relay is energized to close the contacts and to energize the main winding, thereby to reverse the motor.

5. A control device for starting, stopping and reversing a single-phase induction motor of the type having a main running winding and an auxiliary starting winding and a speed-responsive device for disconnecting the auxiliary winding from its source comprising, in combination, a phase-reversing switch for controlling the phase of the current flowing in one of said windings, a relay in circuit with the starting winding for coupling said running winding to its source of energy, said relay including an armature and a pair of electrical contacts in circuit with the running winding, one of said contacts being mounted on the relay armature, and a cam on the phase-reversing switch for engaging the armature and opening the contacts during a phase-reversing operation of the switch.

6. A control device for reversing a single-phase induction motor of the type having a main running winding and an auxiliary starting winding, and a speed-responsive device for disconnecting the auxiliary winding from its source comprising, in combination, a base member, a phase-reversing switch consisting of a member rotatably mounted on said base member and a plurality of conductive wipers rigidly secured to the arm and conductive contacts rigidly secured to the base, said contacts and wipers and associated connections being so arranged that the rotary switch has three positions, a first position in which it causes currents of one phase to flow in one of the windings, a second in which it uncouples the starting winding from its source, and a third in which it causes currents of different phase to flow in said one winding, a snap-action switch mounted on the base and having contacts electrically in series circuit between the main winding and its source, a solenoid mounted on the base and having an exciting winding in series relationship to the auxiliary winding whereby the solenoid is energized to close said contacts thereby to energize the running winding when the auxiliary winding is energized, and means operable in conjunction with said rotatably-mounted member for opening the contacts of said snap-action switch, whereby when said arm is rotated between its first and third positions said main winding is deenergized to permit said motor to slow down to such a degree that the speed-responsive means connects the starting winding to its source.

7. A quick-reversing switch comprising, in combination, a double-pole, double-throw, pole changing switch, and a relay having contacts and means for urging the relay contacts into closed relationship when they have been closed or open relationship when they have been opened; together with electromagnetic means for moving said contacts in one direction and a mechanical connection comprising engaging parts on the pole changing switch and the relay for moving said contacts to their opposite position.

8. A quick-reversing switch comprising, in combination, a double-pole, double-throw, pole changing switch, and a relay having contacts and means for urging the relay contacts into closed relationship when they have been closed or open relationship when they have been opened; together with electromagnetic means including an armature for closing the relay contacts and a mechanical connection comprising engaging parts on the pole changing switch and the relay armature for opening said contacts.

9. A quick-reversing switch comprising, in combination, a double-pole, double-throw, pole changing switch having a forward operating position, a reverse operating position and an off position; together with a relay having contacts and means for urging the relay contacts into closed relationship when they have been closed or open relationship when they have been opened; electromagnetic means for closing said contacts and additional manually operable means comprising engaging parts on the pole changing switch and the relay for opening said relay contacts responsive to movement of the pole changing switch to off position and for releasing said contacts responsive to movement of said pole changing switch to either operating position.

JOHN C. KOONZ.

REFERENCES CITED

The following references are of record in the file of this patent:

UNITED STATES PATENTS

| Number | Name | Date |
|---|---|---|
| 1,168,637 | Hoyt | Jan. 18, 1916 |
| 1,261,744 | Dady | Apr. 2, 1918 |
| 1,316,009 | Weber | Sept. 16, 1919 |
| 1,508,236 | Murdock | Sept. 9, 1924 |
| 1,538,950 | Price | May 26, 1925 |
| 1,576,276 | Hedges et al. | Mar. 9, 1926 |
| 1,681,795 | Waller | Aug. 21, 1928 |
| 1,726,233 | Krantz | Aug. 27, 1929 |
| 1,748,439 | Bugh | Feb. 25, 1930 |
| 2,128,373 | Mekelburg | Aug. 30, 1938 |
| 2,237,705 | Kohl | Apr. 8, 1941 |
| 2,285,687 | Snyder | June 9, 1942 |
| 2,320,176 | Dunham et al. | May 25, 1943 |
| 2,326,760 | Clare | Aug. 17, 1943 |
| 2,407,117 | Warner | Sept. 3, 1946 |
| 2,459,479 | Weinland | Jan. 18, 1949 |

FOREIGN PATENTS

| Number | Country | Date |
|---|---|---|
| 864,821 | France | Feb. 3, 1941 |